June 18, 1946.    J. A. BREWSTER ET AL    2,402,121
REFRIGERATION OF MEAT
Filed July 9, 1942
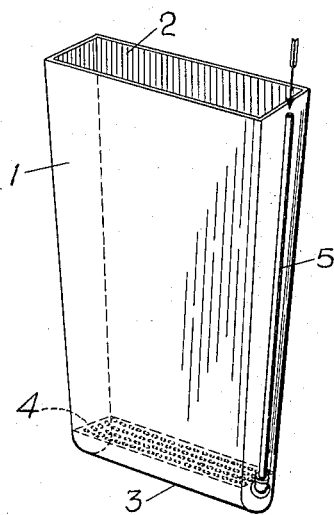
INVENTORS
James Arnold Brewster and Enrique Francisco Fernandez.
BY James Aiken
Attorney.

Patented June 18, 1946

2,402,121

UNITED STATES PATENT OFFICE 2,402,121

REFRIGERATION OF MEAT

James Arnold Brewster and Enrique Francisco Fernandez, Buenos Aires, Argentina, assignors of fifty per cent to The Smithfield and Argentine Meat Company Limited, West Smithfield, London, England, a British corporation, and fifty per cent to Corporacion Argentina De Productores De Carnes, Buenos Aires, Argentina, a corporation of Argentina Application July 9, 1942, Serial No. 450,276
In Argentina January 25, 1942

11 Claims. (Cl. 99—194)

The present invention relates to the refrigeration of meat, and has for its object to provide a new or improved process for the freezing of meat in large pieces, giving certain advantages over methods which have previously been proposed and used for this purpose. The main advantage obtained by the invention is that it is possible rapidly to freeze cuts of meat which are larger in size than has hitherto been possible to freeze satisfactorily. It is, for example, particularly applicable to the freezing of quarters or eighths of boned carcasses of beef.

It is already known to carry out freezing with the aid of dismountable frames or moulds which can be adjusted to suit the size of the product to be frozen, but such methods differ fundamentally from the present invention, which is characterised by the fact that the meat to be frozen is loaded into the mould while a reduced air pressure is maintained therein. Thus the meat is drawn into the mould and forced into close and intimate contact with its walls, owing to the compression of the meat by the internal vacuum and external atmospheric pressure, so that during the subsequent freezing process, the freezing of the meat takes place very rapidly.

For removing the meat from the mould after freezing, pressure may be applied to the interior of the mould in place of the vacuum so as to "blow" the frozen meat out of the mould. This is facilitated by making the mould wedge shaped, with its mouth at the larger end. Also by making the mould of a rectangular cross-section the meat is frozen into slabs of a suitable shape for stacking with economy of space.

In order that the invention may be more clearly understood and readily carried into practice, reference will now be had to the accompanying drawing which shows, in perspective, a mould suitable for use in carrying the invention into practice.

As shown, the mould consists of a metal box 1 of wedge form, which is preferably of rectangular cross-section, with its larger end 2 open, and its smaller end 3 closed, preferably by a curved wall 3. Just above the lower wall 3 is a perforated partition or grill 4 which extends across the interior of the mould. Between the grill 4 and the wall 3 there is a space into which opens the end of a pipe 5, adapted to be connected in any convenient manner to a suitable exhausting apparatus or suction plant so as to create a vacuum within the mould, or to be connected to a plant producing air under pressure as and when desired.

In carrying out the process according to the invention, a piece or pieces, of meat to be frozen, such, for example, as a quarter or an eighth of a carcass of boned beef, is or are introduced into the open end 2 of the mould, and suction is applied through pipe 5 to the space below the grill 4, in consequence of which the meat is drawn into the mould, until it reaches the grill 4, whereupon, as the result of continued application of the suction to space 3, the atmospheric pressure acting at the open end of the mould compresses the meat, so that it conforms closely to the shape of the mould and eliminates voids, whereby close heat conductive contact is made with the walls of the mould.

After having thus packed the moulds with meat they are then frozen in any convenient or well-known manner, as for example, by spraying a freezing medium on them. After freezing, the meat slabs may be removed from the moulds with the aid of pressure applied to the inside of the moulds beneath the meat through pipe 5.

From the foregoing description it will be apparent that very close and intimate contact will be obtained between the meat and the walls of the mould over the maximum proportion of its surface so that the rapidity of freezing of the meat, notwithstanding its large size, such as quarters or eighths of carcasses, is greatly increased in comparison with previously known methods.

The freezing can be carried out while vacuum is still applied through pipe 5, or the pipe 5 may be first disconnected from the vacuum, so that normal pressure prevails throughout the mould during freezing.

An important advantage of the invention is that, owing to the shape of the moulds, the slabs of meat when frozen can be stacked with great economy of space, so facilitating transport on both land and sea.

The invention is not limited to the shape and construction of mould shown in the drawing, since both its construction and shape may be modified in many ways without departing from the invention.

What is claimed is:

1. The process of packing large pieces or cuts of meat in moulds for quick freezing, which comprises the steps of placing said meat into the mouth of said mould, so that said meat hermetically seals said mouth, and evacuating air from said mould so as to draw said meat into said mould and into intimate contact with the inner surface of the walls of said mould.

2. The process of packing large pieces or cuts of meat in moulds for freezing, which comprises the steps of placing said meat into the mouth of said mould, so that said meat hermetically seals said mouth, and evacuating air from said mould so as to draw said meat into said mould and into intimate contact with the inner surface of the walls of said mould.

3. The process of packing large pieces or cuts of meat in moulds for subsequent treatment, which comprises the steps of placing said meat over and into the mouth of said mould, so that said meat hermetically seals said mouth, and evacuating air from said mould so as to draw said meat into said mould and into intimate contact with the inner surface of the walls of said mould.

4. The process of packing large pieces or cuts of meat in moulds for subsequent treatment, which comprises the steps of placing said meat over and into the mouth of said mould, so that said meat hermetically seals said mouth, and evacuating air from said mould so as to draw said meat into said mould and into intimate contact with the inner surface of the walls of said mould, and then discontinuing the evacuation.

5. The process of packing large pieces or cuts of meat in moulds for quick freezing, which comprises the steps of placing said meat over and into the mouth of said mould, so that said meat hermetically seals said mouth, evacuating air from said mould so as to draw said meat into said mould and into intimate contact with the inner surface of the walls of said mould, and freezing said meat while in said mould.

6. The process of packing large pieces or cuts of meat in moulds for freezing, which comprises the steps of placing said meat over and into the mouth of said mould, so that said meat hermetically seals said mouth, evacuating air from said mould so as to draw said meat into said mould and into intimate contact with the inner surface of the walls of said mould, and freezing said meat while in said mould.

7. The process of packing large pieces or cuts of meat in moulds for subsequent treatment, which comprises the steps of placing said meat over and into the mouth of said mould, so that said meat hermetically seals said mouth, evacuating air from said mould so as to draw said meat into said mould and into intimate contact with the inner surface of the walls of said mould, and subsequently treating said meat while in said mould.

8. The process of packing large pieces or cuts of meat in moulds having one side open to the atmosphere, for subsequent treatment, which comprises the steps of placing said meat over and into said open side, so that said meat hermetically closes said mould to the atmosphere and reducing the pressure within said mould so as to draw said meat into said mould, and into intimate contact with the inner surface of the walls of said mould.

9. The process of packing large pieces or cuts of meat in moulds, having one side open to the atmosphere, for quick freezing, which comprises the steps of placing said meat over and into said open side, so that said meat hermetically closes said mould to the atmosphere, reducing the pressure within said mould so as to draw said meat into said mould and into intimate contact with the inner surface of the walls of said mould, and freezing said meat while in said mould.

10. The process of packing large pieces or cuts of meat in moulds, having one side open to the atmosphere, for subsequent treatment, which comprises the steps of placing said meat over and into said open side, so that said meat hermetically closes said mould to the atmosphere, reducing the pressure within said mould so as to draw said meat into said mould and into intimate contact with the inner surface of the walls of said mould, and subsequently treating said meat while in said mould.

11. The process of packing large pieces or cuts of meat in moulds for quick freezing which comprises the steps of placing said meat over and into the mouth of said mould, so that said meat hermetically closes said mould, evacuating air from said mould so as to draw said meat into said mould and into intimate contact with the inner surface of the walls of said mould, stopping said evacuation, and freezing said meat while in said mould.

JAMES ARNOLD BREWSTER.
ENRIQUE FRANCISCO FERNANDEZ.